(No Model.)

H. F. STONE.
MEANS FOR SECURING PULLEYS TO SHAFTS.

No. 427,244. Patented May 6, 1890.

Witnesses,
D. F. Mann
Frederick F. Goodwin

Inventor,
Henry F. Stone
By Offield & Towle,
Atty's

UNITED STATES PATENT OFFICE.

HERBERT F. STONE, OF APPLETON, WISCONSIN, ASSIGNOR TO THE APPLETON MANUFACTURING COMPANY, OF SAME PLACE.

MEANS FOR SECURING PULLEYS TO SHAFTS.

SPECIFICATION forming part of Letters Patent No. 427,244, dated May 6, 1890.

Application filed September 12, 1889. Serial No. 323,707. (No model.)

*To all whom it may concern:*

Be it known that I, HERBERT F. STONE, of Appleton, Outagamie county, Wisconsin, have invented certain new and useful Improvements in Means for Securing Pulleys to Shafts, of which the following is a specification.

My invention relates to means whereby driving-pulleys and fly-wheels used in driving and regulating machines—such as feed-cutters—are so mounted upon the shaft that any unusual resistance to the operation of the machinery will cause the loosening of the wheels, and thereby obviate the danger of breaking the machine.

Figure 1:
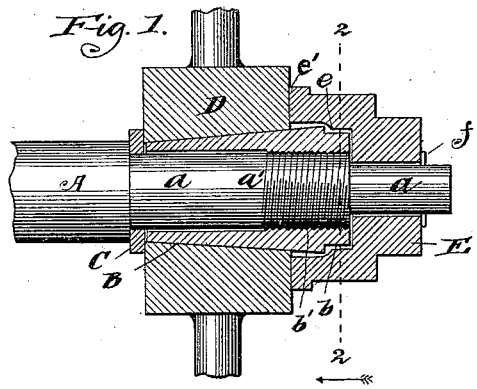
Figure 2:
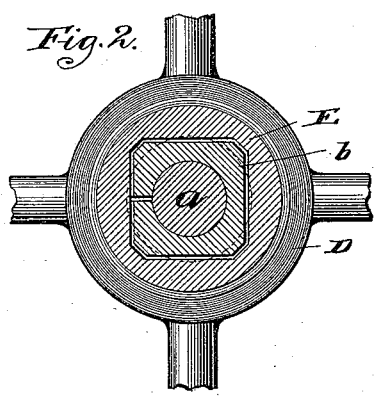
Figure 3:
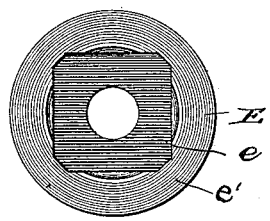
Figure 4:
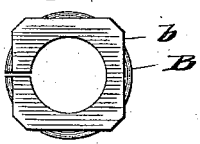

In the accompanying drawings, Figure 1 is an elevation of the portion of the shaft to which the pulley or wheel is applied, the hub of the latter and the bearings therefor being shown in section, the spokes broken away. Fig. 2 is a transverse section on line 2 2 of Fig. 1, looking toward the hub. Fig. 3 is an elevation of the inner end of a retaining-collar, showing therein a rectangular socket to receive the squared end of a tapered sleeve; and Fig. 4 is an elevation of the squared end of the tapered sleeve.

In the drawings, A represents a driving-shaft, which may be the driving-shaft of a feed-cutter or like machine. Said shaft is turned off toward its outer end at $a$ and threaded, as at $a'$. Fitted on the portion $a$ of the shaft A is a sleeve B, having a squared end $b$ and interior threads $b'$ to engage the threads $a'$ on the shaft A. A washer C is preferably slipped over the shaft before sleeve B is put on to provide a bearing for the end of the hub. The exterior of the sleeve B is tapered and the interior of the hub D of the wheel is correspondingly tapered. A collar E, having a rectangular socket $e$ for the squared end of sleeve B and a seat $e'$ for the hub D, is secured on the end of shaft A by a pin $f$. It will be observed that there is a slight clearance between the ends of sleeve B and the socket $e$ and washer C. The squared end of the sleeve fits loosely in the socket, as seen in Fig. 2 of the drawings, so that the squared end may be turned sufficiently in the socket to loosen the hub.

Sleeve B is slit longitudinally, so that by its tendency to close tightly and thus hug the shaft it is prevented from unscrewing too easily.

Now, if any undue obstruction or unusual resistance is encountered in the operation of the machine, the tapered sleeve B will turn sufficiently to loosen the wheel by reason of the longitudinal movement of said sleeve along the shaft and the frictional resistance between the interior of the hub and the exterior of the sleeve, which causes combine to effect the separation of the pulley-hub and sleeve sufficiently to allow the wheel to come to rest without danger of breaking the machinery.

A shoulder may be turned on the shaft to secure the hub in place, in lieu of the washer C, and other modifications may be made in the construction.

I do not consider it essential that the collar E should have the rectangular socket or that the end of the sleeve should be squared; but I prefer to so construct them in order to enable the sleeve to be turned back to place after it has become loosened without removing the collar.

I claim—

1. The combination, with a driving-shaft, of a tapered sleeve threaded thereon and a hub having a tapered bore adapted to said sleeve, substantially as and for the purpose set forth.

2. The combination, with a driving-shaft having a turned-off portion provided with screw-threads, of a tapered sleeve having threads adapted to engage the threads of the shaft, a hub having a tapered bore adapted to the sleeve, and a collar secured on the end of the shaft to bear upon the hub, substantially as and for the purpose set forth.

HERBERT F. STONE.

Witnesses:
F. W. HARRIMAN,
DENNIS MEIDAM.